(12) United States Patent
Radin-Macukat et al.

(10) Patent No.: US 12,343,864 B2
(45) Date of Patent: Jul. 1, 2025

(54) MONITORING A RETRACTION SYSTEM (71) Applicant: BIZLINK ROBOTIC SOLUTIONS GERMANY GMBH, Schmalkalden (DE)

(72) Inventors: Marjan Radin-Macukat, Fuerth (DE); Dirk Moldenhauer, Rednitzhembach (DE); Bernd Joesten, Laatzen (DE); Wei Lin, Hannover (DE); Christian Leupold, Schmalkalden (DE); Denis Friedrich, Elze (DE)

(73) Assignee: BIZLINK ROBOTIC SOLUTIONS GERMANY GMBH, Schmalkalden (DE)

( * ) Notice: Subject to any disclaimer, the term of this patent is extended or adjusted under 35 U.S.C. 154(b) by 226 days.

(21) Appl. No.: 18/010,035

(22) PCT Filed: Jul. 7, 2021

(86) PCT No.: PCT/EP2021/068741
§ 371 (c)(1),
(2) Date: Dec. 13, 2022

(87) PCT Pub. No.: WO2022/008554
PCT Pub. Date: Jan. 13, 2022

(65) Prior Publication Data
US 2023/0249367 A1 Aug. 10, 2023

(30) Foreign Application Priority Data
Jul. 7, 2020 (DE) .................. 102020117885.9

(51) Int. Cl.
*B25J 19/00* (2006.01)
*B25J 19/02* (2006.01)
*H02G 11/00* (2006.01)

(52) U.S. Cl.
CPC ......... *B25J 19/0029* (2013.01); *B25J 19/021* (2013.01); *H02G 11/006* (2013.01)

(58) Field of Classification Search
CPC ........... B25J 19/00; B25J 19/02; H02G 11/00; G01B 7/02
See application file for complete search history.

(56) References Cited

U.S. PATENT DOCUMENTS

| 10,036,655 B2 * | 7/2018 | Utermoehlen ....... G01D 5/2006 |
| 2017/0089730 A1 * | 3/2017 | Utermoehlen ......... G01D 5/243 |

(Continued)

OTHER PUBLICATIONS

Azami et al "Development of the Extension Type Pneumatic Soft Actuator . . . "Sensors and Actuators A: Physical—Oct. 14, 2019oCTO.

*Primary Examiner* — Dominic E Hawkins
(74) *Attorney, Agent, or Firm* — Tarolli, Sundheim, Covell & Tummino LLP (57) ABSTRACT

A device (10) for monitoring a retraction system (100) includes at least one capacitor (14) connected to at least one spring (12) in such a manner that the connection of the at least one spring (12) and the at least one capacitor (14) forms a tuned circuit (16). A frequency determination component (20) is provided and is designed to determine information regarding a frequency of the tuned circuit (16). An evaluation unit (30) is designed to derive information regarding a length of the at least one spring (12) from the information regarding the frequency of the tuned circuit (16).

20 Claims, 5 Drawing Sheets

(56) References Cited

U.S. PATENT DOCUMENTS

2017/0089731 A1\* 3/2017 Utermoehlen ......... G01D 5/243
2017/0335786 A1 11/2017 Smolarek et al.
2021/0001499 A1 1/2021 Hitz \* cited by examiner

MONITORING A RETRACTION SYSTEM

RELATED APPLICATIONS

This application filed under 35 U.S.C § 371 is a national phase application of International Application Number PCT/EP2021/068741, filed Jul. 7, 2021, which claims the benefit of German Application No. 10 2020 117 885.9, filed Jul. 7, 2020, the subject matter of which are incorporated herein by reference in their entirety.

TECHNICAL FIELD

The present invention relates generally to the monitoring of a retraction system. Specifically, the present invention relates to a device for monitoring a retraction system having at least one spring, to such a retraction system having such a device, to a robot having such a device or such a retraction system, and to a method for monitoring such a retraction system.

BACKGROUND

As diversity in automated production technology increases, the demands on energy supply systems increase. Increasingly more often, it is necessary to guide to robots, such as, for example, industrial robots and manufacturing robots, not only electrical and pneumatic lines but also feed hoses for bolts, rivets and screws, for example. That is to say, as well as guiding energy, data and media lines, industrial robots nowadays frequently also guide feed hoses for rivets or screws, for example. The various lines are usually combined together in a line assembly and are often also referred to as a hose assembly. The movements of a robot, in particular of an industrial robot, depending on the application, are complex. Industrial robots in the automotive industry, for example, work with high rotations and rapid movements in order to mount vehicle parts. In order that the lines for data, pneumatics and energy supply are guided as securely as possible to the robot, manufacturers and/or users employ line guides, such as energy chains.

In the multi-axle industrial robots which are conventionally used nowadays, there are fed to the forwardmost robot arm, which is also referred to as the robot hand, by way of a feed arrangement, for example a hose assembly, a plurality of individual lines for supplying a tool, for example a welding tool, arranged on the robot hand.

The individual lines are, for example, electrical supply cables, electrical control cables, data cables and media guides for gases or liquids. These individual lines are usually combined in the common feed arrangement, such as a hose assembly, and surrounded by a tubular protective jacket, for example. Such a hose assembly is subject to high stresses, on the one hand because of the movements of the robot arms relative to one another and in particular also because of the often unfavorable ambient conditions (high temperatures, aggressive media, such as weld spatters, etc.).

The more the robot arm of the robot moves and rotates, the greater the component length required in the lines. In the case of minimal movements, this additional component length is not required and could hang down from the robot. Retraction systems ensure that the lines, such as, for example, the hose assembly, are guided close to the robot during every movement. In other words, the retraction system serves to hold the lines as compactly as possible on the robot arm.

In other words, such line guide devices and/or retraction systems serve, in the field of application of industrial robots, to tighten at least one feed arrangement guided along a robot arm of the industrial robot and to adjust the length of the feed arrangement following a movement of the robot arm. Such a line guide arrangement is known from EP 1 848 571 B1. A line guide device for guiding a supply line, in particular for guiding a hose assembly of an industrial robot, is described therein. A further line guide device in an industrial robot can be found, for example, in DE 201 13 742 U1.

DE 10 2018 204 184 A1 describes a method for monitoring a supply system of a robot. The robot has a robot arm and a robot hand which is movable relative thereto, wherein the supply system has a supply chain, in particular a hose assembly, and a guide for the supply chain, and the supply chain is guided along the robot arm in order to supply the robot hand. The supply system further has a number of sensors for monitoring at least one state variable of the supply system, wherein the functional capability of the supply system is concluded from the values for the state variable that are determined by the sensors. The described system can also be referred to as a retraction system for robots. The retraction system has a sensor system which detects movements (tensile force, acceleration, speed, number, . . . ) of the adjusting mechanism. The mounting of additional sensors of such a sensor system, such as a cable tension sensor on the retraction system, is problematic in view of the available installation space and can in particular entail the risk of a sensor defect.

SUMMARY OF THE INVENTION

There is therefore a need for a device for monitoring a retraction system which ensures integration into the existing installation space of the retraction system in as simple a manner as possible. In particular, it is desirable that this device, for example sensor system, is robust and fail-proof and allows measurements to be performed with sufficient accuracy and without error and with as little additional outlay as possible. The device, for example sensor system, is ideally to be usable on different retraction systems.

According to a first aspect of the invention, a device for monitoring a retraction system is proposed. The retraction system has at least one spring. The device has at least one capacitor which is connected or interconnected with the at least one spring. The at least one capacitor is connected or interconnected with the at least one spring such that the connection or interconnection of the at least one spring and the at least one capacitor forms an oscillating circuit. The device has a frequency determining component. The frequency determining component is configured to determine information relating to/about the frequency of the oscillating circuit. The device has an evaluation unit. The evaluation unit is configured to derive from the information relating to/about the frequency of the oscillating circuit information relating to/about a length of the at least one spring. The information relating to/about a length of the at least one spring can indicate the length of the at least one spring. The length of the at least one spring can be derivable from the information relating to/about the length of the at least one spring.

The retraction system can be a retraction system of a robot, in particular of an industrial robot. The retraction system can be part of a line guide device or feed arrangement of a robot, in particular of an industrial robot. Individual lines for supplying a robot can be combined in a common feed arrangement, such as a hose assembly. The individual lines can be, for example, electrical supply cables, electrical control cables, data cables and media guides or feed hoses for gases, liquids, bolts, rivets and screws.

An oscillating circuit, also referred to as an electrical oscillating circuit or also as a resonant circuit, is an electrical circuit, capable of resonating, which has a coil and a capacitor and is able to perform electrical oscillations. In the oscillating circuit, energy is periodically exchanged between the magnetic field of the coil and the electrical field of the capacitor, whereby high current intensity or high voltage are present alternately. In the device according to the first aspect, the at least one spring serves as the coil.

In other words, if a coil (inductance) and a capacitor (capacitance) are interconnected, an oscillating circuit is formed. The interconnection can take place either in the form of a series connection or in the form of a parallel connection. If a voltage is applied, for example for a short time, to such a circuit, then the capacitor charges up to a maximum of the voltage value of the voltage source. If the voltage is shut off again, then the capacitor discharges again via the coil. By means of the coil, the capacitor charges again with the opposite polarity. The process is repeated multiple times, wherein the voltage level becomes lower over time owing to the active resistances in the oscillating circuit. A damped oscillation is obtained in this way. By contrast, in the ideal case of an undamped oscillation, the voltage values do not decrease.

The at least one spring and the at least one capacitor can in each case be connected in parallel with one another, that is to say can form at least one parallel oscillating circuit. The at least one spring and the at least one capacitor can in each case be connected in series with one another, that is to say can form at least one series oscillating circuit.

The evaluation unit can be configured to derive from the information relating to the frequency of the oscillating circuit, as information about the length of the at least one spring, information about a change in length of the at least one spring. The length of the at least one spring can be derivable or determined from the information about the change in length. For example, the length of the at least one spring can be derivable or determined from the information about the change in length, taking account of a starting length prior to the change in length. From the information about the length or the change in length of the at least one spring, a travel or a movement distance of the associated system, for example retraction system, can be determined.

A spring will change its length when loaded. The coupling factor of the individual windings thus changes. This in turn changes its inductance. In the case of a compressed spring, the individual windings are close(r) together and couple better with one another; thus the inductance increases. In the case of a stretched spring, on the other hand, the windings are far(further) apart and less well coupled; thus the inductance falls. By measuring the inductance, the length of the spring and thus, indirectly, the travel of the associated system having the spring can be determined. The inductance and the frequency of the oscillating circuit are dependent on one another. As a result, when the inductance of the at least one spring changes, the frequency of the oscillating circuit changes.

Such an oscillating circuit has a capacitor and a coil. For example, the oscillating circuit can consist of the capacitor and the coil/spring. The capacitor is initially in the charged state (for example charged by a power source/voltage source). If the power source is uncoupled (e.g. the system then consists only of the capacitor and the coil), the oscillating circuit is/has been established. The electrical field of the capacitor leads to a current flow, which discharges the capacitor. The current thus flowing through the coil induces a magnetic field. The growing magnetic field in turn induces a current, which acts oppositely to the discharging current of the capacitor. As soon as the capacitor is sufficiently discharged, this current becomes greater than the discharging current, and the current flow is reversed. As a result, the capacitor is charged again and the magnetic field is weakened until the starting configuration is reached again. A full cycle has been/is thus completed. The cycle thus begins again—oscillation is underway.

The frequency determining component can be in the form of a digital frequency determining component or can have a digital frequency determining component. The digital frequency determining component is configured to determine as information relating to the frequency of the oscillating circuit a number of pulses that occur in the oscillating circuit during a predefined time period. The predefined time period can correspond to at least part of a cycle of the oscillating circuit, for example to half a cycle of the oscillating circuit. The predefined time period can correspond to a full cycle of the oscillating circuit.

The frequency determining component can be configured to determine the information relating to the frequency of the oscillating circuit taking account of information relating to the frequency of a reference oscillating circuit.

The device can have a digital-analog converter. The digital-analog converter can be configured to convert the information relating to the frequency of the oscillating circuit into a voltage value.

The digital-analog converter can be configured to transmit the voltage value to the evaluation unit. The evaluation unit can be configured to derive from the transmitted voltage value the information about a length of the at least one spring.

According to a first exemplary embodiment, the evaluation unit can receive, for example, the information relating to the frequency of the oscillating circuit from the frequency determining component and can determine the information about the length of the at least one spring, for example, directly from the information relating to the frequency of the oscillating circuit.

According to a second exemplary embodiment, the evaluation unit can receive, for example, the voltage value from the digital-analog converter and can determine the information about the length of the at least one spring, for example, directly from the voltage value, and thus indirectly from the information relating to the frequency of the oscillating circuit.

The device can further have a magnet and a sensor component for detecting the magnet.

The evaluation unit can be configured, when the sensor component detects the magnet, to compare the information, determined on detection, about a length of the at least one spring with previously known information about a length of the at least one spring and to determine information about a deviation (between the determined information and the previously known information) from the comparison.

In this manner, interference fields that occur can be taken into account. When the magnet passes over the sensor or the sensor comes close to the magnet, a previously known position can be compared with the determined position. By means of determined differences, deviations that occur can correspondingly be eliminated or taken into account in the signal. The position of the sensor component and of the magnet relative to one another can thereby be so chosen that, in each cycle, the magnet is detected by the sensor component, for example the magnet passes over the sensor component or vice versa. As a result, in each cycle, any deviation due to interference fields is taken into account or eliminated.

The sensor component can have a Hall sensor or can be in the form of a Hall sensor.

According to a second aspect, a retraction system is proposed. The retraction system has at least one spring. The retraction system has at least one slide connected to the at least one spring. The retraction system has at least one guide. The guide is configured to guide the at least one slide. The slide can move on the guide. In other words, the guide can perform a translational movement on the slide. The retraction system has a device as has been/is described herein.

As a result of the movement of the slide on the guide, the spring is tensioned or relaxed, for example. The slide can be moved out of its starting position by the action of an external force. When the external force is removed, the slide can move on the guide back into the starting position. The spring can be in the form of a tension spring or in the form of a compression spring.

The sensor component can be arranged on the at least one slide and the magnet can be arranged on the at least one guide. Alternatively, the magnet can be arranged on the at least one slide and the sensor component can be arranged on the at least one guide. The position of the sensor component and of the magnet relative to one another can thereby be so chosen that, in each cycle, the magnet is detected by the sensor component, for example the magnet passes over the sensor component or vice versa. As a result, in each cycle, any deviation due to interference fields is taken into account or eliminated.

According to a third aspect, a robot, in particular an industrial robot, is proposed. The robot has a device as has been/is described herein. Additionally or alternatively, the device has a retraction system as has been/is described herein.

According to a fourth aspect, a method for monitoring a retraction system is proposed. The retraction system has at least one spring. At least one capacitor is connected or interconnected with the at least one spring such that the connection or interconnection of the at least one spring and the at least one capacitor forms an oscillating circuit. The method comprises determining information about/relating to a frequency of the oscillating circuit. The method comprises deriving information about/relating to a length of the at least one spring from the information about/relating to the frequency of the oscillating circuit.

Although some of the aspects described hereinbefore have been described in relation to the device, these aspects can also be implemented in a corresponding manner in the retraction system, in the robot and/or in the method.

BRIEF DESCRIPTION OF THE DRAWINGS

The present disclosure is to be explained further with reference to figures. These figures show, schematically.

DETAILED DESCRIPTION

In the following text, without being limited thereto, specific details are set out in order to provide a complete understanding of the present disclosure. However, it will be clear to a person skilled in the art that the present disclosure can be used in other exemplary embodiments which may differ from the details set out hereinbelow. For example, specific configurations and forms are described in the following text which are not to be regarded as limiting.

Figure 1:
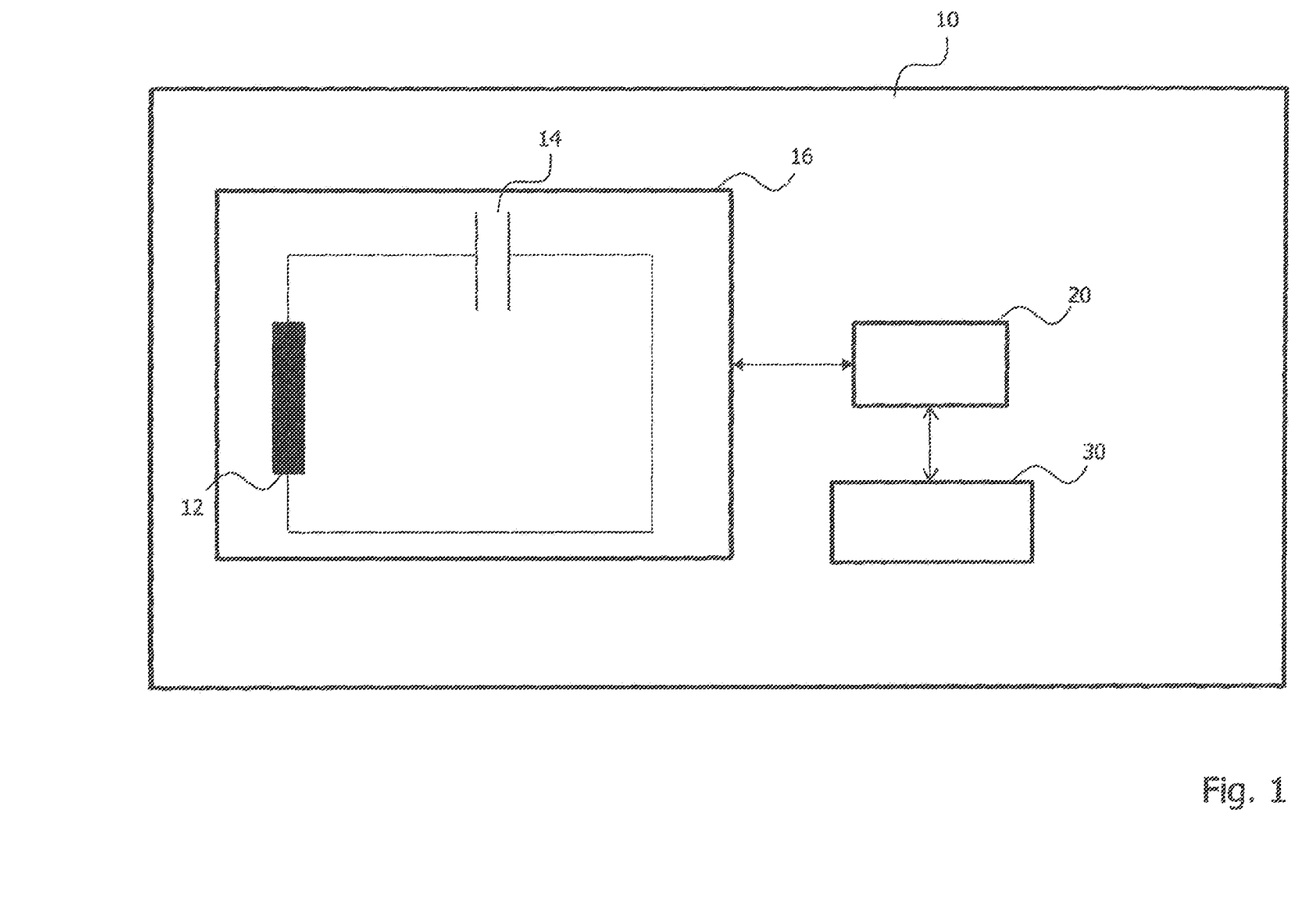
FIG. 1 a block diagram of a device according to a possible exemplary embodiment.

FIG. 1 shows, schematically, a device 10 for monitoring a retraction system. The retraction system is not shown in FIG. 1. The device 10 has a spring 12. The spring 12 is part of the retraction system. In the device 10, the spring 12 serves as the coil. The device 10 further has a capacitor 14. The capacitor 14 and the spring/coil 12 are connected/interconnected with one another such that an oscillating circuit 16, more specifically an LC oscillating circuit, forms as a result of the connection/-interconnection. L thereby represents the inductance of the spring/coil 12. C thereby represents the capacitance of the capacitor 14. In FIG. 1, the capacitor 14 is by way of example connected in series with the spring/coil 12. Therefore, the oscillating circuit 16 in FIG. 1 is by way of example in the form of a series oscillating circuit. Alternatively, the capacitor 14 and the spring/coil 12 can be connected in parallel with one another. In this case, the oscillating circuit 16 is in the form of a parallel oscillating circuit. In FIG. 1, for the sake of simplicity and clarity, only the spring/coil 12 and the capacitor 14 are shown as part of the oscillating circuit 16. The oscillating circuit 16 can, however, have further elements, but these can be disregarded for the purpose of explaining the functionality of the oscillating circuit 16. For example, the oscillating circuit 16 can further have one or more resistors and one or more power sources/voltage sources. Although, for the sake of clarity, only one spring/coil 12 and only one capacitor 14 is shown in FIG. 1, the device 10 is not limited to that number. The device 10 can have more than one spring/coil 12 and/or more than one capacitor 14.

The device 10 further has a frequency determining component 20. The frequency determining component 20 is connected or coupled with the oscillating circuit 16 in such a manner that the frequency determining component 20 is able to determine information about/relating to a frequency of the oscillating circuit 16. The device 10 further has an evaluation unit 30. The evaluation unit 30 is connected/coupled or is able to be connected/coupled with the frequency determining component 20. The evaluation unit 30 is connected/coupled or is able to be connected/coupled with the frequency determining unit 20 such that the evaluation unit 30 can receive the information about/relating to the frequency of the oscillating circuit 16 or can receive information derived from the information about/relating to the frequency of the oscillating circuit 30 from the frequency determining component 20.

Figure 2:
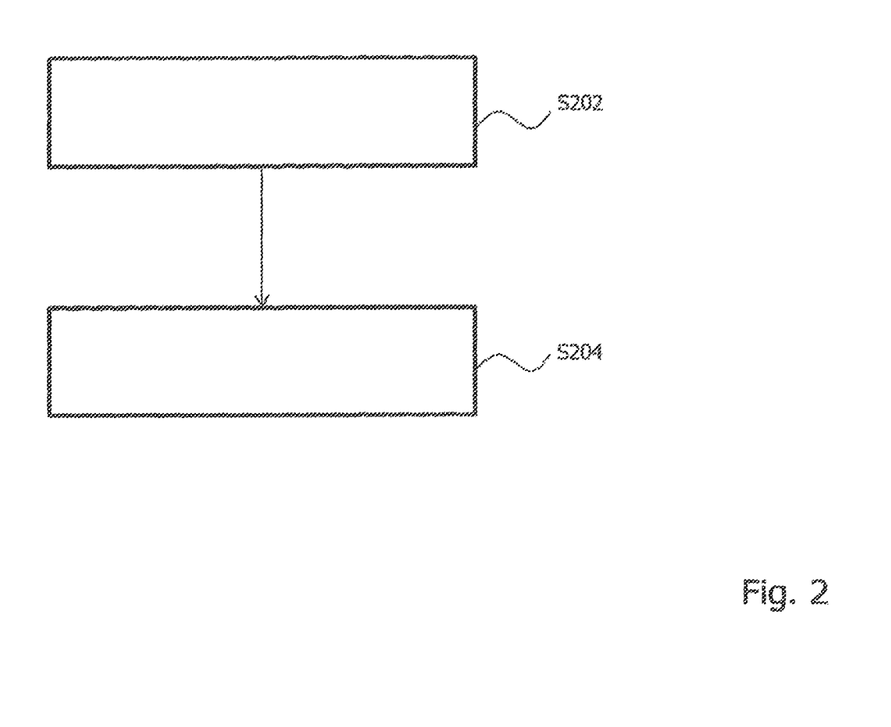
FIG. 2 a flow diagram of a method according to an exemplary embodiment.

The basic operating principle of the device 10 will now be outlined with reference to the flow diagram of FIG. 2. In step S202, the frequency determining component 20 determines information about/relating to a frequency of the oscillating circuit 16. In step S204, the evaluation unit 30 derives information about/relating to a length of the at least one spring/coil 12 from the information relating to/about the frequency of the oscillating circuit 16.

Figure 4A:
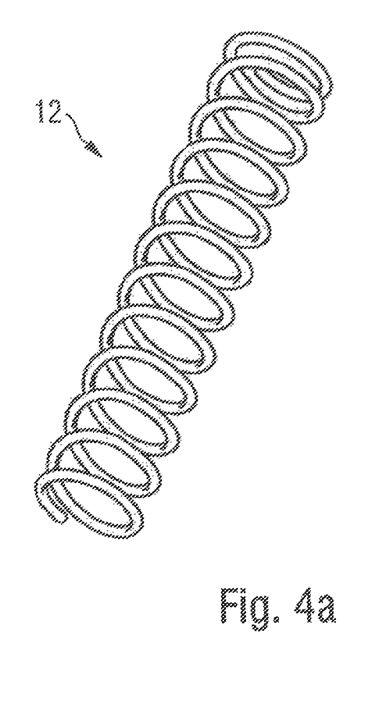
FIG. 4 a spring in different states.
Figure 4B:
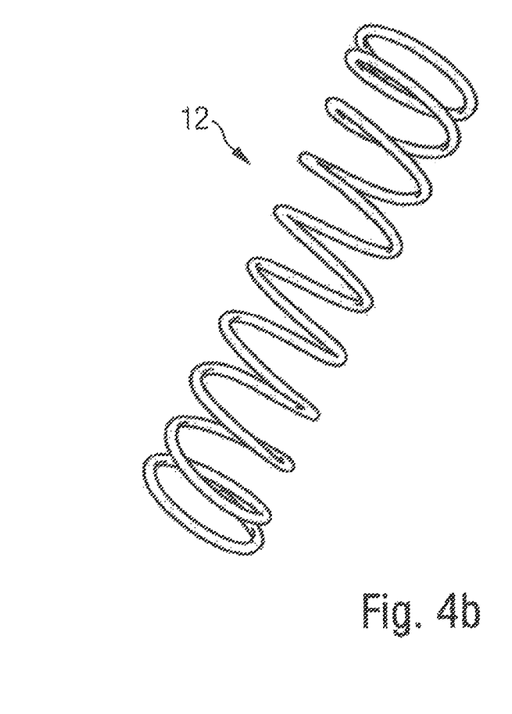
Figure 5:
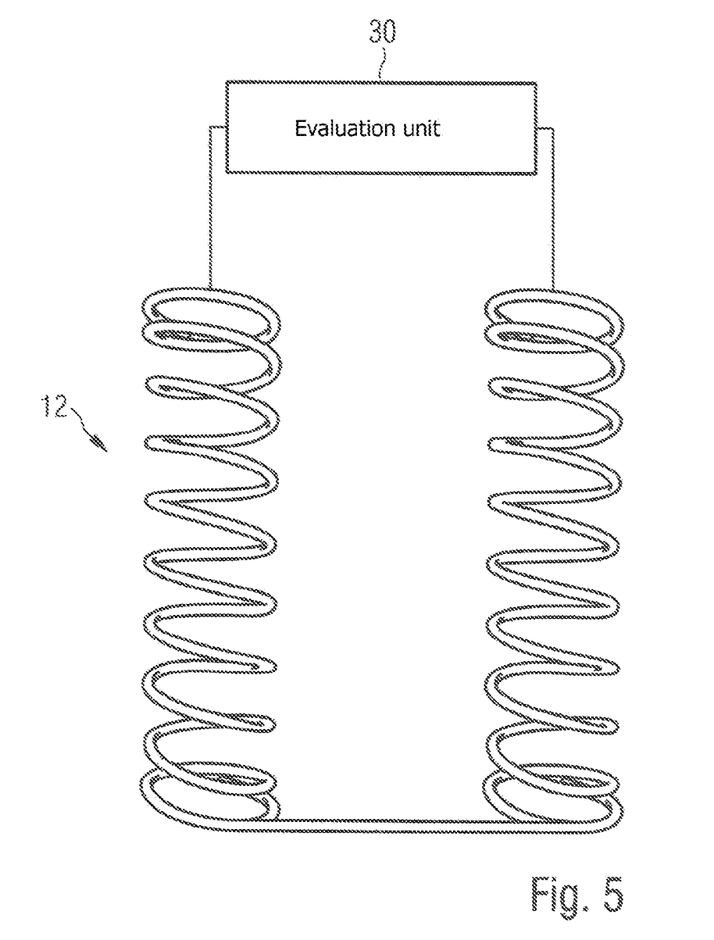
FIG. 5 a possible evaluation of a plurality of springs.

Further possible details and modifications of the exemplary embodiments of FIGS. 1 and 2 will now be described in relation to FIGS. 3 to 5.

Figure 3:
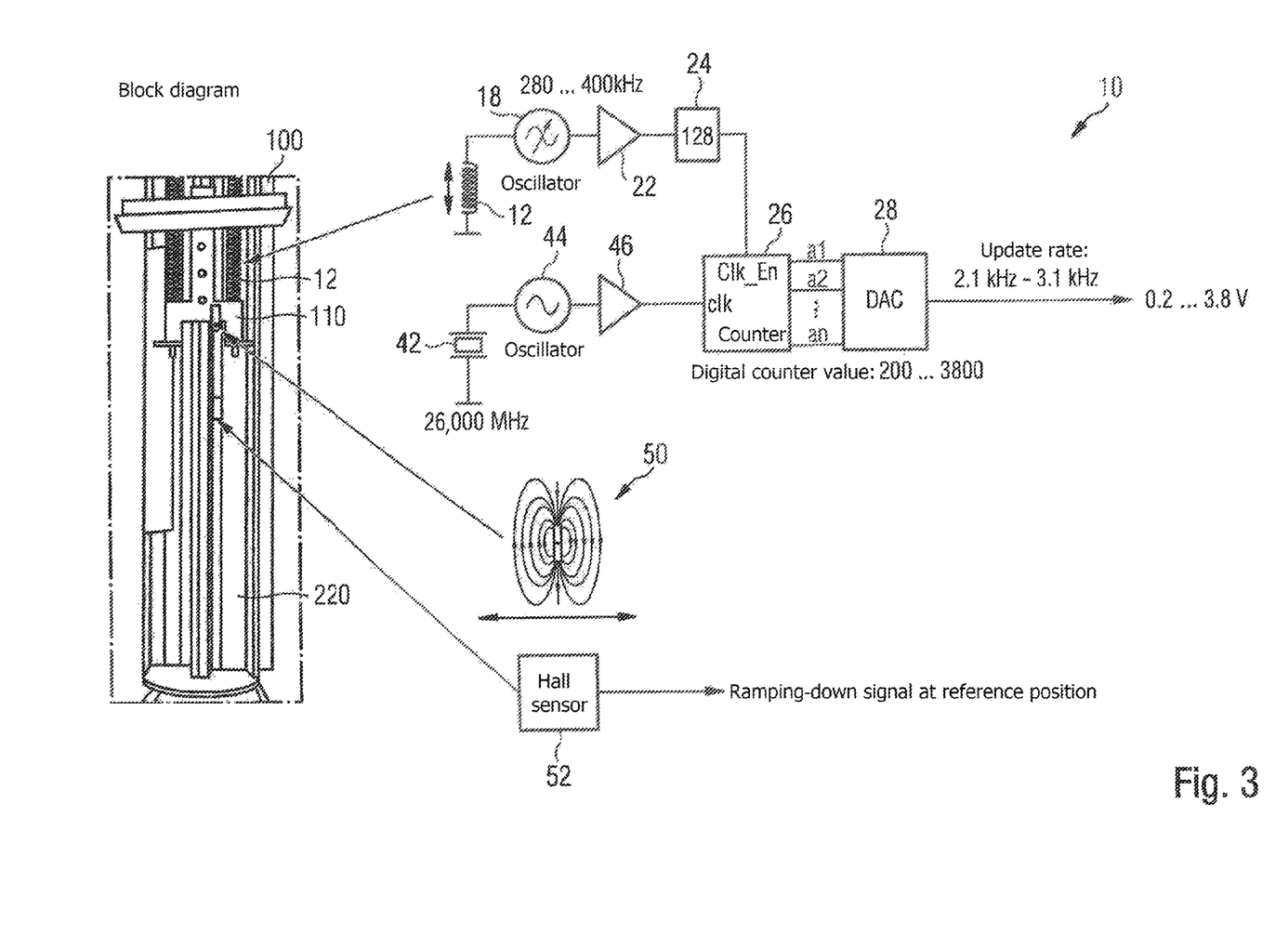
FIG. 3 a retraction system having a device according to a possible exemplary embodiment.

FIG. 3 shows, schematically, a retraction system 100. The retraction system 100 can be used/present in an industrial robot. The retraction system 100 can be part of a line guide device or feed arrangement for an industrial robot or can form the line guide device or feed arrangement. The retraction system 100 has a spring 12. The retraction system 100 further has a slide 110 and a guide 120. The slide 110 is arranged on the guide 120 and is guided by the guide 120. The guide can have, for example, one or more rails which engage into the slide 110 or into which the slide 110 engages. The slide 110 can perform a translational movement on the guide 120. The slide 110 is connected to the spring 12. In FIG. 3, the spring 12 is by way of example in the form of a tension spring. Alternatively, it can also be in the form of a different type of spring 12, for example in the form of a compression spring. In FIG. 3, a starting position of the spring 12 and of the slide 110 is shown by way of example. If the slide 110, by the action of an external force, is moved in translation on the guide 120 from this starting position in a direction contrary to the spring 12 and contrary to the tensile force of the spring 12, then the spring 12 is deflected. If the external force on the slide 100 which moves (moved) the slide 110 in translation is removed, then the slide 110 automatically moves back into its starting position as a result of the tensile force of the spring 12. The spring 12 contracts again and is relaxed.

In the case of a compression spring as the spring 12, the spring 12 is compressed in its starting position, is stretched by the action of an external force and is compressed again when the external force is removed. That is to say, the spring 12 will change its length when loaded. The coupling factor of the individual windings thus changes. This in turn changes its inductance. In the case of a compressed spring (see FIG. 4a), the individual windings are close together and couple better with one another; thus the inductance increases. In the case of a stretched spring (FIG. 4b), on the other hand, the windings are further apart and less well coupled; thus the inductance falls. Therefore, by measuring the inductance, the length of the spring 12 and thus, indirectly, the travel of the slide 110 connected to the spring 12 can be determined.

The spring 12 is shown in FIG. 3 not only as part of the retraction system 100 but also, in the right-hand part of the figure, as part of a circuit. In the circuit, the spring 12 functions as a coil and will therefore be referred to hereinbelow as the spring/coil 12. The spring/coil 12 is, as described in relation to FIG. 1, connected to a capacitor and forms therewith, and optionally with further elements, an oscillating circuit. This oscillating circuit is shown in FIG. 3 by way of example as or as part of an oscillator 18. The oscillator 18 is a variable frequency oscillator. Therefore, the frequency of the oscillator 18 can change in dependence on the stretching and compression, that is to say the length, of the spring/coil 12. Purely by way of example, a frequency range of from 280 to 400 kHz for the oscillator 18 may be mentioned here. In FIG. 3, the spring/coil 12 is shown separately from the oscillator 18, although the spring/coil is actually part of the oscillating circuit and consequently part of the oscillator 18. The spring/coil 12 is shown separately from the oscillator 18 in the figure in order to emphasize the importance of the spring/coil 12 both in the retraction system 100 and in the circuit.

The device 10 further has an amplifier 22 and a pickup 24.

The device 10 further has a reference oscillator or a reference circuit. In FIG. 3, the reference oscillator or the reference circuit is by way of example in the form of a piezoelectric oscillator. The piezoelectric oscillator has a piezoelectric resonator 42, which by way of example is in the form of a piezoelectric crystal, and a constant frequency oscillator 44. An amplifier 46 is connected downstream of the oscillator 44. The outputs of the pickup 24 and of the amplifier 46 are connected to a counter 26. Both the pickup 24 and the amplifier 46 generate from their respective analog input signals a digital clock, which in each case is inputted into the counter 26. The output of the counter 26 is connected to a digital-analog converter 28.

The device 10 further has a magnet 50, which by way of example is in the form of a permanent magnet. The device 10 additionally has a sensor 52, which in FIG. 3 is by way of example in the form of a Hall sensor. The sensor 52 is configured to detect the magnet 50 or, more precisely, to detect the magnetic field of the magnet 50. More specifically, the sensor 52 detects the magnetic field of the magnet 50 when the magnet 50 comes so close to the sensor 52 that the distance between the magnet 50 and the sensor 52 is below a predetermined limit value.

In FIG. 3, the magnet 50 is by way of example arranged on the slide 110 and the sensor 52 is by way of example arranged on the guide 120. Alternatively, however, it is possible that the magnet 50 is arranged on the guide 120 and the sensor 52 is arranged on the slide 110. The distance between the magnet 50 and the sensor 52 in the direction of the extension of the guide 120 is thereby such that the magnet 50 passes the sensor 52 or comes close to the sensor 52 at predetermined time intervals. For example, the distance, in the starting position of the slide 110, is such that the magnet 50 passes or comes close to the sensor 52, or the distance falls below the predetermined limit value, at least once in each cycle of the oscillating circuit.

In order to determine the travel by means of the spring/coil 12, the physical property of a spring on stretching/compression is used. The spring/coil 12 will change its length when loaded. Thus, the coupling factor of the individual windings changes. This in turn changes its inductance. In the case of a compressed spring (FIG. 4a), the individual windings are close together and couple with one another better. Thus the inductance of the spring/coil 12 in the device increases. In the case of a stretched spring (FIG. 4b), on the other hand, the windings are far apart and less well coupled. Thus the inductance of the spring/coil 12 falls. By determining/-measuring the inductance, the length of the spring and thus, indirectly, the travel can then be determined.

The length of the spring/coil 12 is herein measured by the setup in the form of an LC oscillating circuit. The spring/coil 12, more specifically the return spring 12, represents the inductance of the LC oscillating circuit. The change in length owing to the displacement of the slide effects a change in the inductance of the spring/coil 12. As a result of the change in the inductance of the spring/coil 12 there is a change in the frequency of the LC oscillating circuit acting as the oscillator 18.

The frequency of the LC oscillating circuit is determined by the frequency determining component. This can take place, for example, by determining the number of pulses of the reference oscillating circuit. In FIG. 3, the counter 26 detects or receives the pulses of the LC oscillating circuit and the pulses of the reference oscillating circuit. The counter 26 detects or receives the pulses during a predetermined period of time, for example during half a cycle of the LC oscillating circuit. Purely by way of example, a counter value of from 200 to 3800 detected or received by the counter 26 may be mentioned at this point.

The counter value is converted into a voltage by the digital-analog converter 28. The voltage value of the voltage can, purely by way of example, have a value of from 0.2 to 3.8 V. The voltage value can be transmitted to an analysis unit/evaluation unit 30. In this manner, simple transmission of the information to the analysis unit/evaluation unit 30 is made possible. It is further conceivable that the digital-analog converter 28 is omitted and the digital frequency counter value of the counter 26 is used for further data processing. For example, the digital frequency counter value, as has been determined by the counter 26, can be forwarded to the evaluation unit 30 or further data processing can be carried out on the basis of the digital counter value in the counter 26. It is thus conceivable that further evaluation is carried out in the digital-analog converter. In other words, the counter 26 can have the evaluation unit 30 or can be in the form of the evaluation unit 30, or the evaluation unit 30 can have the counter 26 or be in the form of the counter 26.

In order to reduce measuring errors or ideally avoid them altogether, in particular an offset of the voltage of the LC oscillating circuit owing to interference fields that occur in the industrial environment, there are further arranged or installed, for calibration, the sensor 52, for example a Hall sensor, on the guide 120 and a magnet 50 on the slide 110 (or vice versa). When the sensor 52 is passed over, a (previously known) position is compared with the position determined by the LC frequency in order to eliminate deviations that occur in the signal (i.e. an offset). The position of the Hall sensor 52 is so chosen that the slide 110 passes over it in every cycle if possible. More specifically, when the sensor 52 detects the magnet 50, the length or change in length of the spring/coil 12 is determined and compared with a previously known, for example stored, length or change in length which should be present at that position of the slide 110. If a deviation between the measured length or change in length of the spring/coil 12 and the previously known, for example stored, length or change in length of the coil/spring 12 is determined, then the deviation is taken into account in the/all length or change in length calculations in the cycle and/or in further cycles, for example all cycles. In an embodiment variant, a deviation is determined at least once per cycle, and this deviation is taken into account for all calculations in the same cycle. In this manner, the accuracy of the determination of the length or change in length of the spring/coil 12 is increased.

Although the invention has been explained in relation to only one spring, the invention is not limited thereto. Thus, it is also possible, in systems having a plurality of springs 12, to connect the springs in parallel or in series, as is indicated in relation to FIG. 5. In this case, the total inductance resulting overall from the respective connection can be used for determining the length or change in length of the spring 12 and thus for determining the travel of the slide 110. In this case, it is conceivable to connect or contact the evaluation unit 30 with only the fixed ends of the springs 12. The mechanical setup in this case is simple and stable.

In order to increase the sensitivity of the measuring method, a greater change in inductance can be achieved in that one or more iron cores are positioned partially or completely in the system and the compression and/or stretching of the spring leads to a relative change in position/overlap between the spring and the core. The shape of the core can be changed in order to achieve effects of different kinds (e.g. linear or exponential changes in inductance). As an alternative to an iron core inside the spring(s), a ring around the spring(s) can also be used.

By measuring the length of the spring and thus the travel of the slide 110, additional information can be obtained, such as, for example, cycle detection, a mechanical load, a spring force, a displacement speed, accelerations, etc., which may be relevant for a statistical evaluation and preventive maintenance. The above-described method with the corresponding setup can be widely used especially in the case of the use of the energy supplies and the retraction device on industrial robots.

The invention claimed is:

1. A device for monitoring a retraction system having at least one spring, wherein the device has:
   at least one capacitor which is interconnected with the at least one spring such that the interconnection of the at least one spring and the at least one capacitor forms an oscillating circuit;
   a frequency determining component which is configured to determine information about a frequency of the oscillating circuit; and
   an evaluation unit which is configured to derive from the information about the frequency of the oscillating circuit information about a length of the at least one spring, wherein the frequency determining component is in the form of a digital frequency determining component or has a digital frequency determining component, and the digital frequency determining component is configured to determine as information about the frequency of the oscillating circuit a number of pulses that occur in the oscillating circuit during a predefined time period.

2. The device as claimed in claim 1, wherein the evaluation unit is configured to derive from the information about the frequency of the oscillating circuit, as information about the length of the at least one spring, information about a change in length of the at least one spring.

3. The device as claimed in claim 1, wherein the frequency determining component is configured to determine the information about the frequency of the oscillating circuit taking account of information about the frequency of a reference oscillating circuit.

4. The device as claimed in claim 1, wherein the device has a digital-analog converter which is configured to convert the information about the frequency of the oscillating circuit into a voltage value.

5. The device as claimed in claim 4, wherein the digital-analog converter is configured to transmit the voltage value to the evaluation unit, and the evaluation unit is configured to derive from the transmitted voltage value the information about a length of the at least one spring.

6. A retraction system having:
   at least one spring;
   at least one slide connected to the at least one spring;
   at least one guide which is configured to guide the at least one slide; and
   a device as claimed in claim 1.

7. The retraction system as claimed in claim 6, wherein a sensor component is arranged on the at least one slide and a magnet is arranged on the at least one guide; or a magnet is arranged on the at least one slide and a sensor component is arranged on the at least one guide.

8. A robot having the retraction system as claimed in claim 6.

9. A robot having the device as claimed in claim 1.

10. A device for monitoring a retraction system having at least one spring, wherein the device has:

at least one capacitor which is interconnected with the at least one spring such that the interconnection of the at least one spring and the at least one capacitor forms an oscillating circuit;

a frequency determining component which is configured to determine information about a frequency of the oscillating circuit;

an evaluation unit which is configured to derive from the information about the frequency of the oscillating circuit information about a length of the at least one spring; and a magnet and a sensor component for detecting the magnet.

11. The device as claimed in claim 10, wherein the evaluation unit is configured, when the sensor component detects the magnet, to compare the information, determined on detection, about a length of the at least one spring with previously known information about a length of the at least one spring and to determine information about a deviation from the comparison.

12. The device as claimed in claim 10, wherein the sensor component has a Hall sensor or is in the form of a Hall sensor.

13. The device as claimed in claim 10, wherein the evaluation unit is configured to derive from the information about the frequency of the oscillating circuit as information about the length of the at least one spring, information about a change in length of the at least one spring.

14. The device as claimed in claim 10, wherein the frequency determining component is configured to determine the information about the frequency of the oscillating circuit taking account of information about the frequency of a reference oscillating circuit.

15. The device as claimed in claim 10, wherein the device has a digital-analog converter which is configured to convert the information about the frequency of the oscillating circuit into a voltage value.

16. The device as claimed in claim 15, wherein the digital-analog converter is configured to transmit the voltage value to the evaluation unit, and the evaluation unit is configured to derive from the transmitted voltage value the information about a length of the at least one spring.

17. A retraction system having:

at least one spring;

at least one slide connected to the at least one spring;

at least one guide which is configured to guide the at least one slide; and a device as claimed in claim 10.

18. The retraction system as claimed in claim 17, wherein the sensor component is arranged on the at least one slide and the magnet is arranged on the at least one guide; or the magnet is arranged on the at least one slide and the sensor component is arranged on the at least one guide.

19. A robot having the device as claimed in claim 10.

20. A method for monitoring a retraction system having at least one spring, wherein at least one capacitor is interconnected with the at least one spring such that the interconnection of the at least one spring and the at least one capacitor forms an oscillating circuit, wherein the method comprises:

determining, by a frequency determining component, information about a frequency of the oscillating circuit, wherein the frequency determining component is in the form of a digital frequency determining component or has a digital frequency determining component;

deriving information about a length of the at least one spring from the information about the frequency of the oscillating circuit; and determining as information about the frequency of the oscillating circuit a number of pulses that occur in the oscillating circuit during a predefined time period.

* * * * *